Feb. 17, 1970  D. W. BURR ET AL  3,496,374
MEASURING APPARATUS USING SCANNING MEANS AND COUNTING MEANS
Filed Nov. 14, 1966  3 Sheets-Sheet 1

Inventor
Donald William Burr
Peter O'Donnell
By Cushman, Darby & Cushman
Attorneys

Feb. 17, 1970        D. W. BURR ET AL        3,496,374

MEASURING APPARATUS USING SCANNING MEANS AND COUNTING MEANS

Filed Nov. 14, 1966        3 Sheets-Sheet 3

INVENTORS
DONALD WILLIAM BURR
PETER O'DONNELL

BY Cushman, Darby & Cushman
ATTORNEYS

United States Patent Office 3,496,374
Patented Feb. 17, 1970

3,496,374
MEASURING APPARATUS USING SCANNING MEANS AND COUNTING MEANS
Donald William Burr and Peter O'Donnell, Malvern, England, assignors to the Minister of Aviation in Her Majesty's Government of the United Kingdom of Great Britain and Northern Ireland, London, England
Filed Nov. 14, 1966, Ser. No. 594,082
Claims priority, application Great Britain, Nov. 16, 1965, 48,567/65
Int. Cl. H01j 3/14, 5/16, 39/12
U.S. Cl. 250—237
14 Claims

ABSTRACT OF THE DISCLOSURE

A system for measuring the relative position of a first object and a second object in which the second object carrier scale marks of a first kind and scale marks of a second kind more widely spaced than the scale marks of the first kind and means for distinguishing between different scale marks of the second kind and including means for scanning the scale marks of the first kind and means for determining the position of the first object relative to a scale mark of the second kind.

---

The present invention relates to measuring systems.

There is a great demand in the machine tool industry and elsewhere for accurate linear and angular measuring systems which are suitable for operating electronic equipment, for example, displays and automatic control equipment. For example, in a precision lathe it is necessary to know to some accuracy where the cutting edge of a tool is located. This is commonly estimated by a lead screw; however, accurate lead screw systems are very expensive. As a result, various electrical and optical systems have been developed, but they are all either expensive for the accuracy they offer or suffer from some serious disadvantage.

It is an object of the invention to provide an accurate but relatively inexpensive measuring system which will avoid some of the disadvantages of previous systems.

It is a further object of the invention to provide an accurate measuring system for use in automatic machine tool control systems of the kind described in the specification of British Patent No. 1,143,541.

According to the present invention there is provided a system for measuring the relative position of a first object and a second object in which the second object carries scale marks of a first kind and scale marks of a second kind more widely spaced than the scale marks of the first kind and means for distinguishing between different scale marks of the second kind and including means for scanning the scale marks of the first kind and means for determining the position of the first object relative to a scale mark of the second kind.

The scale marks may be contained on a linear or radial line scale, the scale marks of the first kind being the regular close lines and the scale marks of the second kind being auxiliary equidistant lines a greater distance apart.

The system may further include means for generating moire fringes for the more accurate determination of position.

Each mark of the second kind may be made unique so that by reference to the particular scale mark of the second kind relative to which the position of the first object is determined, the position of the first object is determined relative to the second object.

Figure 1:
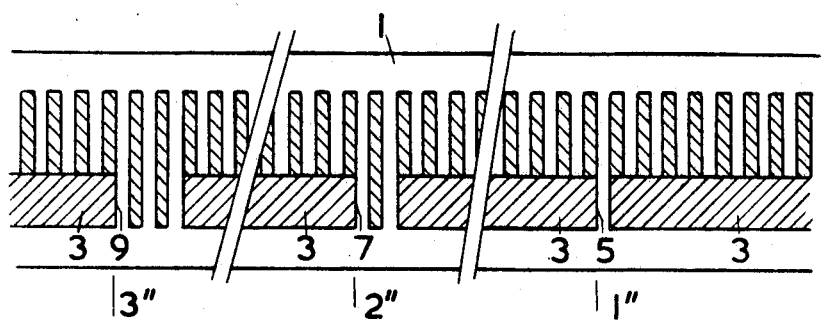
Figure 2:
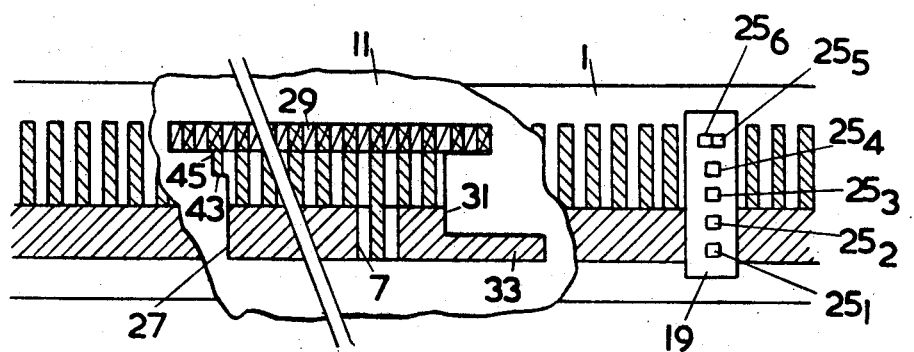
Figure 3:
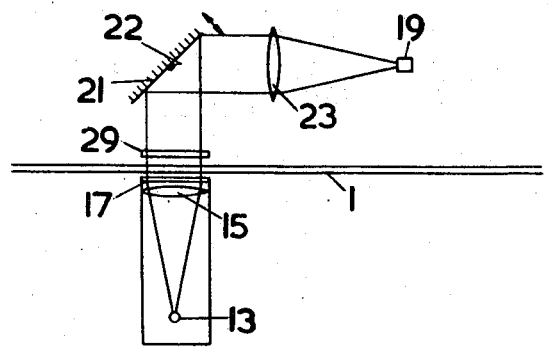
Figure 4:
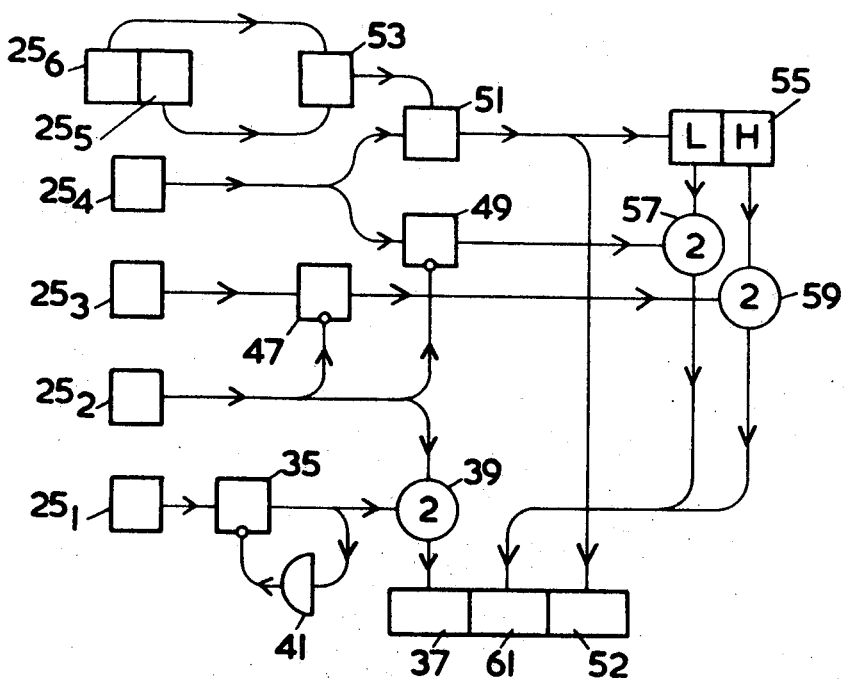
Figure 5:
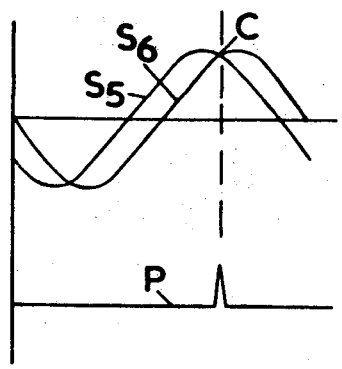
Figure 6:
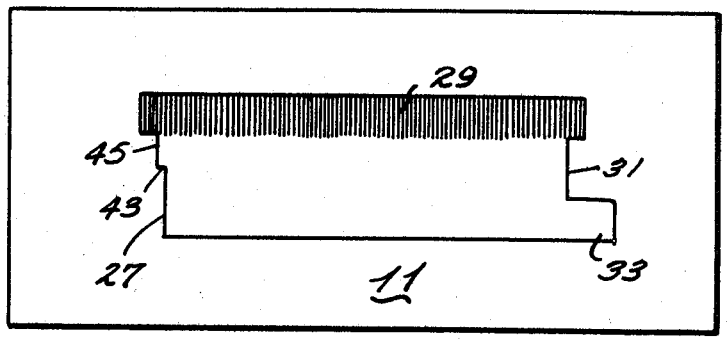
Figure 7:
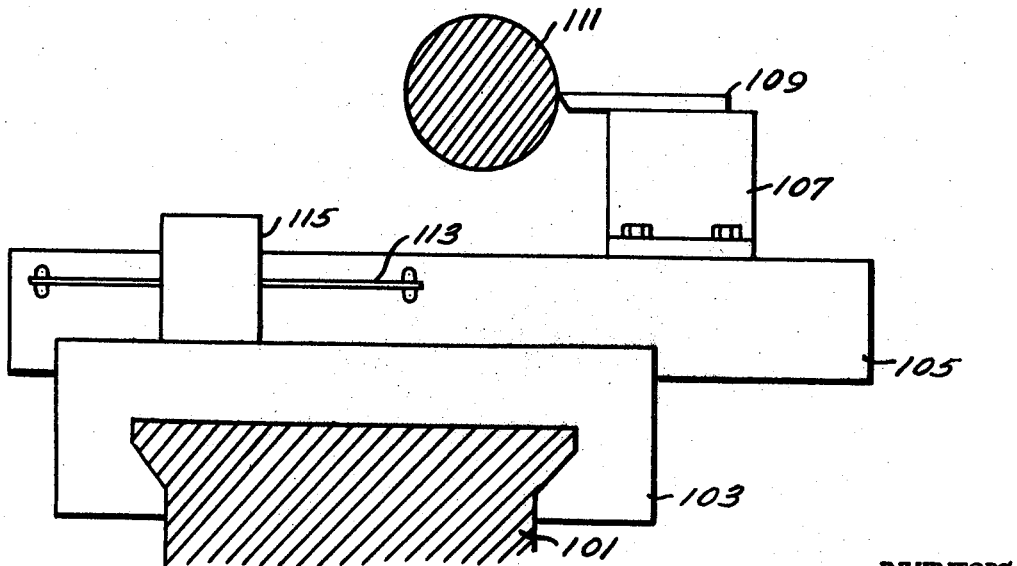

An embodiment of the invention will be described by way of example with reference to the accompanying drawings, in which:

FIGURE 1 is a drawing of part of an optical line scale for use in a linear measuring system using inches as units;
FIGURE 2 is a diagram of a graticule and an array of photocells used with the line scale illustrated in FIGURE 1;
FIGURE 3 is a diagram of the optical part of the measuring system in use;
FIGURE 4 is a block diagram of the electronic part of the measuring system; and
FIGURE 5 is a graph of waveforms occurring in the part of the system illustrated in FIGURE 4, plotted against time.
FIGURE 6 shows the graticule in its full length; and
FIGURE 7 illustrates the various elements of this invention as they are mounted on a lathe.

GENERAL DESCRIPTION

In FIGURE 1 the second object, which is a conventional optical line scale 1 (of, say, 100 lines to the inch) has been modified by masking part of the lines at one edge. The masking material 3 is opaque and the right hand extremity of each piece of masking material 3 is exactly one inch from the right hand edge of the adjacent piece. The gaps between the pieces vary, however, so that the number of spaces (between the lines) between adjacent pieces of masking material 3 is the same as the number of inches from the right hand end of the line scale 1. In this way the line scale 1 is not only exactly marked every inch but also the marks are labelled. In FIGURE 1 mark 5, 7 and 9 for one, two and three inches respectively are shown. The inches are shown below the drawing for clarity.

In FIGURE 2 and in FIGURE 6 there is shown the first object or graticule 11 for use with the line scale 1. The system is designed to measure the distance between the graticule 11 and the end of the line scale 1 or some other fixed point. The line scale 1 is illuminated as shown in FIGURE 3, by a lamp 13 via a lens system 15. The graticule may be a mask 17 placed between the lens system 15 and the line scale 1 or a mask placed on the opposite side of the line scale 1 from the lens system 15. An image of the unmasked part of the line scale that is illuminated is thrown on an array 19 of photocells via a mirror 21 and a further lens system 23 as shown in FIGURE 3. The mirror 21 is oscillated about an axis 22 with a frequency of, say, 50 cycles per second so that the image of the whole of the line scale within the graticule 11 is swept across the array 19 during each cycle of oscillation of the mirror 21.

The array 19 consists of six photocells $25_1$, $25_2$, $25_3$, $25_4$, $25_5$ and $25_6$ and their positioning relative to the line scale 1 is illustrated in FIGURE 2. The function of the photocells $25_1$, $25_2$, $25_3$, $25_4$, $25_5$ and $25_6$ is to measure the position of the graticule 11 with reference to the line scale 1, as follows.

The photocells $25_1$ and $25_2$ are located so that an image of the part of the line scale 1 that is partially masked by material 3 is thrown upon them. The dimensions of the graticule 11 are such that during the cycle of oscillation of the mirror 21 the photocells $25_1$ and $25_2$ will receive a number of pulses of light which will be the same as the number of complete inches in the distance to be measured. The details of this part of the system are described below.

The purpose of the photocells $25_3$ and $25_4$ is to measure the hundredths of an inch, i.e. the number of lines beyond the inch mark noticed by the photocells $25_1$ and $25_2$. As an image of the line scale 1 is thrown on the photocells $25_3$ and $25_4$ and swept across them the number of pulses of light received by them will be a constant depending on the internal width of the graticule 11. However the number of pulses of light received beginning with the pulse corresponding to the inch mark (such as 7) and ending with the left hand edge 27 of the opening of the graticule 11 will be the same as the number of hundredths of an inch in the distance to be measured. The details of this part of the system also are described below.

The purpose of the photocells $25_5$ and $25_6$ is to measure, in conjunction with the photocell $25_4$, the number of ten-thousandths of an inch, i.e. fractions of a line width. This is done by moire fringe counting techniques. A 99 line per inch line scale conventionally shown at 29 is either held by the graticule or held fixed relative to it in some other way. In FIGURE 3 it is shown between the line scale 1 and the mirror 21. The photocells $25_5$ and $25_6$ are used to measure the relative phase of the one moire fringe per inch pattern obtained by the superimposition of the two line scales. The details of this part of the system also are described below.

COMPLETE INCHES

The details of the part of the system which measures the complete number of inches are as follows. The opening in the graticule 11 is roughly rectangular between a left-hand edge 27 parallel to the lines on the line scale and a right-hand edge 31 parallel to the left-hand edge 27. The distance between the edges 27 and 31 is exactly one inch. The part of the line scale whose image is shown on the photocell $25_2$ is the part between the edges 27 and 31 that is partially masked by material 3. The opening in the graticule 11 has also an elongated portion 33 projecting beyond the edge 31, and the part of the line scale whose image is thrown on the photocell $25_1$ is the part between the edge 27 and the extreme end of the elongated portion 33 that is partially masked by material 3.

The purpose of this part of the graticule is to count the number of pulses of light (representing complete inches) in an unambiguous way, in the following manner. Since the distance between the edges 27 and 31 is exactly one inch, there will always be either an index mark such as inch mark (such as 7) between the edges 27 and 31 or an inch mark exactly at each edge. The inch mark (such as 7) between the edges 27 and 31 will be called the relative inch mark; if it is near the edge 31 then some of the spaces between the lines (the number of which gives the complete number of inches) might be hidden by that part of the graticule 11 beyond the edge 31 were it not for the elongated portion 33. In other words, the presence of the elongated portion enables the spaces to be counted. On the other hand, if the inch mark (such as 7) is near the edge 27 then the next inch mark (such as 5, FIGURE 1) may show through the elongated portion 33 and the cell $25_1$ has to be controlled effectively to ignore this mark (so to speak) and to record the correct mark.

This is achieved by sweeping the image of the line scale visible through the graticule across the array 19 of cells in such a direction that an image of the elongated portion 33 of the graticule is first presented to the array 19, then an image of the roughly rectangular portion between the edges 31 and 27 and finally the edge 27 itself.

During each sweep the spaces in the field of view of the photocell $25_1$ are counted. If the last space in a group of spaces coincides with a space in the field of view of the photocell $25_2$ then it represents the relative inch mark and the number of spaces counted via the photocell $25_1$ is the required number of complete inches. If the last space in a group of spaces in the field of view of the photocell $25_1$ does not coincide with a space in the field of view of the photocell $25_2$ then the spaces are wholly within the elongated portion 33 and the inch mark they refer to is not the relative inch mark. Later in the sweep (towards the edge 27) there will be a further group of spaces concluding with the inch mark. The spaces will be in the fields of view of both photocells $25_1$ and $25_2$ and so the last space will fulfil the requirement that it must coincide with a space in the field of view of the photocell $25_2$ and therefore will be correctly taken to represent the relative inch mark.

The method by which this is achieved is illustrated in FIGURE 4, in which the photocell $25_1$ is shown feeding a counter 35, the output of which is applied to a store 37 via an AND gate 39. The photocell $25_2$ feeds the AND gate 39 directly. The count in the counter 35 is sent to the store 37 only when pulses of light are received by the photocell $25_2$. The counter 35 is reset by its own output via a delay 41. This enables each count to start from zero and nullifies the effect of an abortive count in which the output of the counter is not transferred to the store 37. Of course it should be clearly understood that although the index marks referred to herein are specifically with respect to inch marks that other types of measurements and distances may be used to establish the index marks and to perform the detailed measurements of this invention. Clearly, this invention is effective for increments of measurement other than inches.

TENTHS AND HUNDREDTHS OF AN INCH

The details of the part of the system which measures the hundredths of an inch are as follows. The number of pulses of light received by the photocell $25_3$ beginning with the pulses corresponding to the relative inch mark (such as 7) and ending with the edge 27 of the opening of the graticule 11 will be the same as the number of hundredths of an inch from the inch mark (such as 7) and the left-hand edge 27 of the graticule 11, which is the number of hundredths of an inch to be measured.

A step 43 in the left-hand edge 27 of the graticule 11 is one line wide (i.e. half the inter-line distance) and so the left hand edge 45 on the other side of the step 43 from the edge 27 is 1.005 inches from the right hand edge 31 of the graticule. Therefore the number of pulses of light received by the photocell $25_4$ may exceed the number received by the photocell $25_3$ by one. This is used (as described below) to prevent spurious readings of hundredths at the time when the number of hundredths is near to changing, in conjunction with the estimation of fractions of a line width.

In FIGURE 4 the photocells $25_3$ and $25_4$ are shown feeding separate counters 47 and 49 respectively. The output of the photocell $25_2$ is used to reset the counters 47 and 49 so that at the end of the cycle of oscillation the counters 47 and 49 (or one of them) will contain the correct number of hundredths of an inch.

THOUSANDTHS AND TEN-THOUSANDTHS OF AN INCH

The details of the part of the system which measures ten-thousandths of an inch are as follows. The line scale 29 is held with its lines parallel to the lines on the line scale 1 and so the moire fringes will also be parallel to the lines on the line scale 1. There will, of course, be one fringe to the inch. This fringe can be thought of as a sinusoidal function of distance, and for a movement of graticule 11 along the line scale 1 of one line (0.01 inch) the sine wave will change its phase by exactly 360°. In other words, if the phase of the sine wave is measured with an accuracy of 3.6° then the position of the graticule 11 along the line scale 1 is known to an accuracy of 0.0001 inch.

The method of estimating the ten-thousandths of an inch will be described wth reference to FIGURE 5, which is a graph of waveforms occurring in this part of the system. Since the photocells $25_5$ and $25_6$ are disposed longitudinally with reference to the line scale 1, then their out puts will be sine waves of slightly different phase: this is illustrated in FIGURE 5, where the sine wave outputs of the photocells $25_5$ and $25_6$ are denoted by $S_5$ and $S_6$ respectively. The two sinewaves cross at one point near their troughs and one point C near their peaks; it is easy by conventional means to generate a pulse at the instant at which the crossing C occurs. Such a pulse is denoted by a waveform P in FIGURE 5. Now the relative phase of the moire fringe is proportional to the distance between the edge 31 of the graticule 11 and the peak C of the waveform; measured in ten-thousandths of an inch, it is equal the number of pulses of light received by the photocell $25_4$ beginning with the instant at which the image of the right hand edge 31 of the graticule 11 is swept across it and ending with the pulse immediately preceding the peak P. Accordingly the output of the photoell $25_4$ is applied (as shown in FIGURE 4) to a further counter 51 and the outputs of the photocells $25_5$ and $25_6$ are applied to a pulse generator 53 whose output is applied to terminate the counting in the counter 51. The counter 51 will therefore contain a number which is the number of ten-thousandths of an inch to be measured. This number may be appled to a store 52.

Those skilled in the art will be familiar with the problem of synchronising changes of digits in adjacent decimal places. For example, as a reading moves slowly towards 3.1400 inches, successive readings should read: 3.1397; 3.1398; 3.1399; 3.1400; and the hundredths digit must change at exactly the instant that the thousandths and ten-thousandths do; otherwise spurious readings such as 3.1499 or 3.1300 might occur. This is the reason for the two versions of the hundredths digit in the two counters 47 and 49. At the time when the counter 51 changes from 99 (or 356.4° phase angle) to 00 (phase angle 360°=phase angle zero) the read-out means is instructed to change from taking the reading from the counter 47 to that from the counter 49. Since at this instant the reading in the counter 49 will be greater than that in the counter 47 the hundreths digit will always be correct.

This is achieved by a comparator 55 which controls two AND gates 57 and 59, the common output of which is applied to a store 61. The comparator 55 compares the reading in the counter 51 with the number 50; if the reading is below 50 the AND gate 57 is opened; if it is above 50 the AND gate 59 is opened. The opening of the AND gate 57 allows the reading in the counter 49 to be stored and the opening of the AND gate 59 allows the reading in the counter 47 to be stored.

A conventional display means, for example, a digital display (not shown) may be provided; it would display the reading in the stores 37, 61 and 52. Typically, however (alternatively or additionally) the stored readings would be used in an automatic control system, such as is described in British Patent No. 1,143,541.

As an alternative to a 99 line per inch line scale 29 parallel to the line scale 1 for producing moire fringes parallel to the line scale 1 a 100 line per inch line scale (not shown) may be used. In this case the lines on the new line scale would be oblique to both the line scales. In this case the two photocells $25_5$ and $25_6$ may be in line with the remaining photocells $25_1$, $25_2$, $25_3$ and $25_4$, the necessary phase difference being provided by the obliqueness of the moire fringes.

The invention may obviously be used in a rotating system; in that case the line scale 1 will be a radial line scale (i.e. the lines on the scale will be radial) in order that angular distance may be accurately measured.

FIGURE 7 shows a conventional lathe having a lathe bed 101 supporting a saddle 103 on which is mounted a cross-slide 105. A tool post 107 is bolted to the cross-slide 105 and supports a tool 109, which is shown cutting a workpiece 111. The cross-slide 105 supports a line scale 113, which corresponds to the line scale 1 in FIGURES 1, 2 and 3, and which works in co-operation with apparatus 115, which contains the other elements of FIGURE 3. The apparatus 115 being mounted on the saddle 103, movement of the tool 109 towards and away from the axis of the workpiece 111 is accompanied by motion of the line scale 113 relative to the apparatus 115, which motion will be exactly the same (neglecting distortion in the tool post 107).

The invention is obviously not limited to a system in which inches are used as units; any other units whatsoever may be used.

We claim:
1. A system for measuring the relative position of a first object and a second object with respect to one another in which said second object carries scale marks of a kind that are lines of a line scale and second scale marks of the kind more widely spaced than said line scale marks;
    means operatively associated therewith for distinguishing between different said scale marks of said second kind;
    means operatively associated with said line scale for scanning said line scale;
    means operatively oriented for determining the position of said first object relative to a scale mark of said second kind;
    means for counting said line of said line scale coupled to said means for scanning said line scale;
    means operatively associated with said line scale for measuring an increment of motion of less than one inter-line distance on said line scale;
    wherein said means for measuring an increment of motion of less than one inter-line distance on said line scale includes means for generating moiré fringes.

2. A system as in claim 1 including means for counting lines on said line scale up to a predetermined part of the waveform of said moiré fringes.

3. A system as in claim 2, including means for generating two moiré fringe waveforms between which there is a small constant phase difference.

4. A system for measuring the relative position of a first object and a second object with respect to one another in which said second object carries scale marks of a kind that are lines of a line scale and second scale marks of the kind more widely spaced than said line scale marks;
    means operatively associated therewith for distinguishing between different said scale marks of said second kind;
    means operatively associated with said line scale for scanning said line scale;
    means operatively oriented for determining the position of said first object relative to a scale mark of said second kind;
    means for counting said line of said line scale coupled to said means for scanning said line scale;
    means operatively associated with said line scale for measuring an increment of motion of less than one inter-line distance on said line scale; and
    further including means for making two counts of said scale marks of said first kind and means for accepting one of said two counts, said means for accepting one of said two counts being operationally connected to said means for measuring an increment of motion of less than one inter-line distance on said line scale.

5. Apparatus for measuring the relative position with respect to each other of a first object and a second object, said apparatus including scanning means and counting means in which:
    the second object carries scale marks transverse to the line of possible relative motion and spaced equidistantly along the line of possible relative motion and index marks transverse to the line of possible relative motion each index mark being associated with a separate particular scale mark and the separate particular scale marks being spaced equidistantly along the line of possible relative motion but more widely spaced than the scale marks, and each index mark including marking means distinctive as between the index mark and recognizable by scanning and counting;
    the first object carries at least one fiducial line and means for producing in co-operation with the scale marks a moiré fringe pattern along the line of possible relative motion;

and wherein the scanning and counting means include means for scanning and counting the distinctive marking means of an index mark, means for scanning and counting the scale marks between the index mark and a fiducial line and means for scanning and counting the scale marks between a predetermined point of the moiré fringe pattern and a fiducial line.

6. A system as claimed in claim 5 and in which the scale marks are lines of a line scale.

7. A system as claimed in claim 6 and in which the line scale is a linear line scale.

8. A system as claimed in claim 6 and in which the line scale is a radial line scale.

9. A system as claimed in claim 5 and including an optical sensor and in which the line scale is an optical line scale alternate segments of which constitute lines and spaces respectively for providing different amounts of light on the optical sensor.

10. A system as claimed in claim 6 and including an optical sensor and in which the line scale is an optical line scale alternate segments of which constitute lines and spaces respectively for providing different amounts of light on the optical sensor.

11. A system as claimed in claim 7 and including an optical sensor and in which the line scale is an optical line scale alternate segments of which constitute lines and spaces respectively for providing different amounts of light on the optical sensor.

12. A system as claimed in claim 5 and including means for generating two moiré fringe patterns between which there is a small constant phase difference whereby the said predetermined point of the moiré fringe patterns is determined.

13. A system as claimed in claim 5 and including means for making two counts of the scale marks between the index mark and the fiducial line and means for accepting one of the two counts according to the state of the output of the means for scanning and counting the scale marks between the predetermined point of the moiré fringe pattern and the fiducial line.

14. A system as claimed in claim 5 and in which each index mark is given a plurality of labelling marks the number of which corresponds to the distance between the said index mark and a fiducial point.

References Cited

UNITED STATES PATENTS

| | | |
|---|---|---|
| 2,845,710 | 8/1958 | Claret et al. |
| 3,153,111 | 10/1964 | Barber et al. |
| 3,387,139 | 6/1968 | Gerard et al. _____ 250—237 |

JAMES W. LAWRENCE, Primary Examiner

V LAFRANCHI, Assistant Examiner

U.S. Cl. X.R.

250—208, 230; 356—167, 170